United States Patent
Nakayama et al.

(10) Patent No.: US 10,244,770 B2
(45) Date of Patent: Apr. 2, 2019

(54) METHOD FOR PRODUCING DRIED FOOD

(75) Inventors: Takateru Nakayama, Osaka (JP); Kazuki Yoshida, Osaka (JP); Seiko Tamura, Osaka (JP); Mitsuru Tanaka, Osaka (JP)

(73) Assignee: NISSIN FOODS HOLDINGS CO., LTD., Osaka (JP)

(*) Notice: Subject to any disclaimer, the term of this patent is extended or adjusted under 35 U.S.C. 154(b) by 398 days.

(21) Appl. No.: 14/131,763

(22) PCT Filed: Jul. 13, 2012

(86) PCT No.: PCT/JP2012/067917
§ 371 (c)(1),
(2), (4) Date: Apr. 9, 2014

(87) PCT Pub. No.: WO2013/008910
PCT Pub. Date: Jan. 17, 2013

(65) Prior Publication Data
US 2014/0220206 A1 Aug. 7, 2014

(30) Foreign Application Priority Data
Jul. 13, 2011 (JP) .................. 2011-155096

(51) Int. Cl.
A23B 4/037 (2006.01)
A23B 4/005 (2006.01)
A23B 4/06 (2006.01)
A23L 5/10 (2016.01)
A23L 13/10 (2016.01)

(52) U.S. Cl.
CPC ............ *A23B 4/037* (2013.01); *A23B 4/0053* (2013.01); *A23B 4/06* (2013.01); *A23L 5/13* (2016.08); *A23L 13/10* (2016.08)

(58) Field of Classification Search
CPC .. A23B 4/00; A23B 4/03; A23B 4/037; A23B 4/005; A23B 4/0053; A23L 1/00; A23L 1/31
USPC ....................... 426/443, 444, 665
See application file for complete search history.

(56) References Cited

U.S. PATENT DOCUMENTS

| | | | | | |
|---|---|---|---|---|---|
| 1,484,863 | A | * | 2/1924 | Becker | A23L 1/16 426/557 |
| 2,365,890 | A | * | 12/1944 | McBean | F26B 17/04 34/225 |
| 3,233,334 | A | * | 2/1966 | Hamilton | A23B 4/037 34/191 |
| 2008/0063761 | A1 | * | 3/2008 | Saito | A21D 2/36 426/250 |
| 2010/0316777 | A1 | * | 12/2010 | Joly | A23B 4/044 426/302 |
| 2011/0129582 | A1 | | 6/2011 | Miyazaki et al. | |
| 2012/0027906 | A1 | * | 2/2012 | Eisner | A23B 4/037 426/541 |

FOREIGN PATENT DOCUMENTS

| | | | | |
|---|---|---|---|---|
| CA | 2757297 | A1 | 10/2010 | |
| CN | 101068479 | A1 | 11/2007 | |
| JP | 57-115158 | | 7/1982 | |
| JP | 62-215337 | | 9/1987 | |
| JP | 62215337 | A * | 9/1987 | ............... A23B 4/04 |
| JP | 2006-262706 | | 10/2006 | |
| JP | 2006262706 | A * | 10/2006 | ............... A23B 4/03 |
| JP | 2011-30501 | | 2/2011 | |
| JP | 2011030501 | A * | 2/2011 | ............... A23L 1/16 |
| RU | 2200921 | C1 | 3/2003 | |
| TW | 201103442 | A | 2/2011 | |
| WO | WO 2010111983 | A1 * | 10/2010 | ............. A23B 4/037 |
| WO | 2011/013185 | | 2/2011 | |

OTHER PUBLICATIONS

China Office action in CN 2012 80034207.X, dated Sep. 4, 2014.
International Search Report dated Oct. 9, 2012 in PCT/JP2012/067917 and English language version.
European Search report issued with respect to application No. 12811184.6, dated Mar. 10, 2015.
Nathakaranakule et al., "Comparative study of different combined superheated-steam drying techniques for chicken meat", Journal of Food Engineering, vol. 80, No. 4, Jan. 18, 2007, p. 1023-p. 1030, XP005834546.
Pattra Laopoolkit et al. "Effect of pretreatments and vacuum drying on instant dried pork process optimization", Meat Science, vol. 88, No. 3, Feb. 10, 2011, p. 553-p. 558, XP028369731.
Speckhahn et al., "Drying of Beef in Superheated Steam", Drying Technology, vol. 28, No. 9, 2010, pp. 1072-1082.
Office Action issued in Chinese Counterpart Patent App. No. 201280034207.X, dated May 27, 2016 , along with a partial English translation thereof.
Fellows, P. J., "Freeze drying and freeze concentration, 687-699. 10.1533/9781845696344.4.687. In book: Food Processing Technology", 2009, pp. 687-699.
Office Action in IN Patent Application No. 373/DELNP/2014 dated Jan. 29, 2018 with Eng. translation.

* cited by examiner

*Primary Examiner* — W Moore
(74) *Attorney, Agent, or Firm* — Greenblum & Bernstein, P.L.C.

(57) ABSTRACT

Provided is a method for producing meat-based dried food that is to be reconstituted by pouring hot or cold water thereto before eating, comprising: a step of processing a meat raw material or meat-based food with superheated steam; a step of freezing the meat raw material or meat-based food processed with superheated steam; and a step of drying the frozen meat material or meat-based food under reduced pressure. It is possible to reconstitute the dried food produced by the production method in a short time of about 3 to 5 minutes even if the dried food is thick.

6 Claims, No Drawings

METHOD FOR PRODUCING DRIED FOOD

TECHNICAL FIELD

The present invention relates to a method for producing meat-based dried food.

BACKGROUND ART

There are many instant foods that are to be reconstituted with hot or cold water. Dried foods are used in the instant foods. Particularly in the field of cup noodles, meat-based dried foods (dried ingredients) such as char siu (roast pork fillet) are much used.

Such meat-based dried food has to be reconstituted by pouring boiling water thereto in about 3 to 5 minutes. In order to allow reconstitution in a stated time period, the size (thickness) of meat-based dried ingredients has been important.

That is, although there are some differences depending on types and production methods of dried foods, if a method wherein heated meat is frozen and dried in the frozen state under reduced pressure (so-called freeze drying method) is used, it is possible to reconstitute the dried meat with a thickness of approximately 10 mm at the maximum in about 3 to 5 minutes, depending on types of the meat and production methods. In contrast, if the thickness is 10 mm or more, it has been often difficult to allow reconstitution in about 3 to 5 minutes.

If it is possible to achieve meat-based ingredients with large thickness, it becomes possible to provide consumers with voluminous instant food. Additionally, along with diversification of tastes of consumers, needs for meat-based dried ingredients with large thickness are increasing.

As a method for enhancing reconstitution properties, disclosed is a method for producing dried meat in which, after a sugar solution is injected such that the sugar content is 5% by weight relative to the raw meat, the meat is heated, sliced into a thickness of 3 mm or less and dried (Patent Literature 1). If this method and the freeze-drying method are combined, the possibility of producing thicker dried meat is promising.

However, there has been a problem that the taste influence on the dried meat is large because the content of sugar is high in the method.

CITATION LIST

Patent Literature

Patent Literature 1: Japanese Patent Application Laid-Open No. 57-115158

SUMMARY OF INVENTION

Technical Problem

Therefore, the present inventors set as a problem to be solved to develop a method for producing a meat-based ingredient that is reconstitutable in 3 to 5 minutes even if the thickness is larger than the conventional.

Solution to Problem

As a result of intensive studies, the present inventors have found that, in the case where a step of processing a meat raw material or meat-based food with superheated steam is performed in any of the stages in a method for producing meat-based dried food and then the resulting material or food is frozen and dried in the frozen state (freeze drying), the meat-based dried food produced has the enhanced reconstitution properties with hot or cold water.

That is, the first invention of the present application is a method for producing meat-based dried food that is to be reconstituted by pouring hot or cold water thereto before eating, the method comprising: a step of processing a meat raw material or meat-based food with superheated steam; a step of freezing the meat raw material or meat-based food processed with superheated steam; and a step of drying the frozen meat raw material or meat-based food under reduced pressure.

The above-described production method preferably comprises a step of adding moisture to the meat raw material or meat-based food after the superheated steam processing step and before the freezing step. The reconstitution properties of the dried food after freeze drying are enhanced by adding moisture before freezing.

In the above-described production method, it is preferred to perform the superheated steam processing step in the state where the moisture contained in the meat raw material or meat-based food is frozen. If the superheated steam processing step is performed in the state where the moisture contained in the meat raw material or meat-based food is frozen, it is possible to perform superheated steam processing concurrently with thawing, which is effective in reducing production period, for example.

The above-described production method preferably comprises the step of adding moisture to the meat raw material or meat-based food followed by performing the superheated steam processing, after the superheated steam processing step and before the freezing step, and additionally, it is preferred to repeat the step more than once. By performing the step, it is possible to enhance the effect of the superheated steam processing, and thereby the reconstitution properties of the dried food to be obtained are enhanced. By repeating the step more than once, it is possible to further enhance the effect of the superheated steam processing, and thereby the reconstitution properties of the dried food to be obtained are further enhanced.

DESCRIPTION OF EMBODIMENTS

Embodiments of the present invention will be described in the following. In this context, the present invention is not limited to the following embodiments.

1. Meat-Based Dried Food to be Reconstituted by Pouring Hot or Cold Water Thereto Before Eating The present invention is related to dried food to be reconstituted by pouring hot or cold water thereto. Additionally, the present invention is particularly related to dried food utilizing a meat raw material or meat-based food. It is possible to use such dried food for various foods such as instant cup noodles and instant cup soup. It is also possible to use the dried food as preservative food such as survival food in an emergency.

2. Meat Raw Materials

Meat raw materials referred to in the present invention include chicken, pork, beef, horse meat, mutton, and so on. The production of dried food of the present invention is carried out using these meat raw materials. The meat raw materials also include meat processed into minced forms as well as massive forms such as block forms. In the production method of the present invention, as the raw material it is possible to use these meat raw materials as fresh, but it is also possible to use frozen ones.

In the present invention, as described below, it is also possible to perform superheated steam processing on meat in the frozen state during thawing.

3. Meat-Based Food

The meat-based food referred to in the present invention means the food for which the above-described meat raw material is used. For example, the meat-based foods include hamburg steaks and meatballs which is made by using the meat raw material (for example, beef or pork) to be minced, adding vegetables such as onion as appropriate thereto, and shaping.

In this way, the meat-base food referred to in the present invention is the subject of the present invention. In the case where hamburg steaks and the like are prepared using meat raw materials such as minced meat, vegetable-based raw materials such as onion and garlic are used, and, in addition to such vegetable-based raw materials, seasonings such as soy sauce and sauce and spices may be used.

4. Superheated Steam Processing Step (1) Superheated Steam Processing

Superheated steam refers to saturated steam whose temperature is forcibly increased to 100° C. or more under atmospheric pressure. It is possible to perform the superheated steam processing step in the method for producing dried food as described above.

It is possible to select superheated steam processing conditions as appropriate, but it is generally typical that the inside temperature of a superheated steam processing apparatus is about 120° C. to 300° C., the steam flow rate is about 100 to 250 kg/h, and the processing time at one time is about 10 seconds to 4 minutes.

(2) Application of the Superheated Steam Processing Step in the Present Invention It is possible to add the superheated steam processing step in the present invention to a common method for producing meat-based dried foods as a part or the whole of the method at various stages.

Generally, meat-based dried foods are produced through a heating step and then a freeze drying step of meat raw material or meat-based food (hereinbelow, referred to as "meat raw materials and the like".)

The heating step, which is a necessary step for producing normal meat-based dried foods, is performed for both sterilization and cooking of meat raw materials and the like. Normally, braising, boiling, deep frying, microwave or the like is used as the heating step.

Since the superheated steam processing are performed at an elevated temperature of 100° C. or more as described above, it is possible to allow the superheated steam processing to correspond to a common heating step, or it is possible to perform the superheated steam processing step in addition to a common heating step.

This point will be described in detail.

First, in the method for producing meat-based dried food, it is possible to perform the superheated steam processing step before the step of heating meat raw materials and the like. For example, the steps of the method can be performed in the order of the superheated steam processing step, the heating step and then the freeze drying step of meat raw materials and the like. Additionally, this case is effective when meat raw materials and the like are in the frozen state, because it is possible to perform the superheated steam processing also for the thawing purpose.

It is also possible to add the superheated steam processing step after the heating step. That is, the steps can be also performed in the order of the heating step, the superheated steam processing step, and the freeze drying step of the meat raw materials and the like. Specifically, it is the case where, after the meat raw materials and the like are heated with steam and the like, the superheated steam processing is further performed.

Additionally, since superheated steam is at an elevated temperature of 100° C. or more as described above, it is possible to utilize the superheated steam processing as a part of the heating step for the meat raw materials and the like. That is, it is possible to use the superheated steam processing and other heating methods (such as braising, boiling, deep frying, and microwave) in combination with the heating step. For example, it is possible to use the superheated steam processing and the braising (steam) as the heating step, sequentially or separately. That is, it is also possible to perform the braising processing subsequent to the superheated steam processing or to perform the braising processing first, perform cooling once, and then, perform the superheated steam processing. Furthermore, in the case where microwave is used as the heating means, it is also possible to apply the superheated steam processing during microwave irradiation.

Alternatively, a method, wherein only the superheated steam processing step is performed as the heating step, and the superheated steam processing and the freeze drying steps of meat raw materials and the like are performed in this order, is also possible.

Although the reason why the reconstitution properties after pouring hot or cold water are enhanced by using the superheated steam processing, which is the effect of the invention, is not clear, it is believed as the followings: specific structure changes are caused by the superheated steam processing in the surface and inside of the meat raw material, the structure thus formed is allowed to freeze as described below, and the material is dried with the structure maintained to a certain extent by drying in the frozen state under reduced pressure.

5. Repetition of the Superheated Steam Processing Step

The above-described superheated steam processing may be performed more than once. That is, a method in which, after the first superheated steam processing is performed, moisture is added to the subject meat raw materials and the like, and the superheated steam processing is applied again is also effective.

Since the surface of the meat may be dried if a long-period superheated steam processing is performed, a step of adding water to the surface is added. In this way, by repeating a set of "superheated steam and addition of moisture" as a superheated steam processing more than once, it is possible to enhance the effect of the superheated steam processing.

Although not particularly limited and selectable as appropriate, examples of the method for adding moisture include showering, and immersion in an immersion bath. Additionally, it is also possible to add a seasoning liquid at this time.

In normal superheated steam processing, the surface of an object may be over-dried to lead to baking, depending on the temperature of the steam and the moisture content of the object. Thus, except the case where such is intended with purpose, it is necessary to perform addition of water and the like in the course of the superheated steam processing step.

In this context, although the number of repetition is not particularly limited, it is generally possible to enhance the effect by repeating the set of "superheated steam and addition of moisture" twice or more.

6. Drying in the Frozen State Under Reduced Pressure (Freeze Drying)

In the above-described drying step, a method in which an object is once frozen and the frozen object is dried under reduced pressure (so-called, freeze drying) is adopted. As one example of the method for drying food there is the hot-air drying method, which provides hot air only, but the hot-air drying method is not preferable for meat-based dried food because the tissue would shrink when the moisture evaporates. In contrast, in the freeze drying method, since drying progresses by sublimation of ice in the frozen food, there is no change in the form due to drying, and it is possible to provide a porous dried food still in the form as it cooked. That is, it is believed that it is possible to perform drying with maintaining the unique structure of the meat raw material formed by the superheated steam processing to some extent. It is believed that this unique structure is to involve in the reconstitution properties.

7. Addition of Moisture Before Freeze Drying

It is preferred to add water before the above-mentioned freezing. By addition of water, it is possible to eliminate reconstitution ununiformity at the time of reconstitution with hot or cold water to thereby achieve uniform reconstitution in the dried food after freeze drying.

Specifically, after the above-mentioned heating step or superheated steam processing step, freezing is performed, and the freeze drying step proceeds. In this case, water is added before the freezing. For example, in the case where freeze drying processing proceeds directly after the superheated steam processing, it is beneficial to add water before freezing.

It becomes possible to eliminate ununiformity at the time of reconstitution to result in effective reconstitution, by adding moisture again to the object meat whose moisture has been reduced by the superheated steam processing and then drying under reduced pressure.

The method for adding moisture is not particularly limited. That is, adding water with spray and the like or adding water by immersion in water or a seasoning liquid is possible.

8. Freeze Drying Method

Drying of the meat raw material and the like after freezing is performed under reduced pressure (the freeze drying method). The conditions of freeze drying are in accordance with the normal conditions, and freeze drying is performed at a degree of vacuum of approximately 0.8 Torr or less and a shelf temperature of about 50° C. to 70° C. for approximately 14 to 24 hours.

9. Dried Food after Freeze Drying

It is possible to utilize dried food after freeze drying for various instant foods. Particularly, it is possible to use the dried food as ingredients of instant cup noodles and the like. It is necessary to reconstitute the dried food in about 3 to 5 minutes when the food is usually used for instant cup noodles. As for the dried food obtained by the production method of the present invention, it is possible to reconstitute thick meat-based dried food, which was difficult to reconstitute as for the dried food obtained by the conventional production method.

EXAMPLES

Examples of the present invention will be described hereinbelow, but the present invention is not intended to be limited to these Examples.

Test Example 1

(Example 1) (Case of Superheated Steam Processing Only)

Effects of the superheated steam processing were evaluated using freeze-dried fried chicken made of chicken as a meat raw material. The freeze-dried fried chicken was prepared according to the following procedure.

Excess fat, tendons, and blood vessels were removed from chicken breast blocks (at a product temperature of 10° C. or less). The chicken breast obtained was chopped with a chopper of a mincer plate hole size of 4.7 mm.

To 1000 g of the chicken breast after chopping, 400 g of plant protein reconstituted with water to four times volume, 200 g of seasoning (containing soy sauce, salt, sugar, reduced sugar syrup, spices, and the like), and 200 g of water were mixed, and then, further mixed with a mixer for 3 minutes. The chicken breast after mixing was stuffed into a casing with a diameter of 60 mm (450 g/60 cm) and frozen at −40° C. for 3 hours.

Next, the chicken breast remaining in a frozen state was cut so as to achieve a width of 20 mm. The cut chicken breast was subjected to the superheated steam processing comprising "superheated steam processing (1 minute), water immersion (30 seconds), superheated steam processing (1 minute), water immersion (30 seconds), and superheated steam processing (1 minute)" in this order, using a superheated steam processing apparatus (continuous flat conveyor type). In this case, the superheated steam processing was performed under conditions of a steam temperature of 180° C. and a steam flow rate of 150 kg/h.

The chicken breast after the superheated steam processing was water cooled, 0.5 g/piece of batter for deep fry (wheat flour, seasoning, spices, and pigment) was adhered to the surface of the chicken breast cooled, and the resulting chicken breast was deep-fried in palm oil at 180° C. for 20 seconds to prepare fried chicken. Next, the fried chicken was slow frozen to a product temperature of 0 to −10° C. over about 10 hours. Furthermore, the frozen fried chicken was placed in a vacuum freeze dryer and freeze dried while keeping a shelf temperature at 60° C. under 0.8 Torr for 24 hours to thereby obtain dried fried chicken breast.

(Example 2) (Case Where Steam Processing and Superheated Steam Processing is Combined)

Except that steam processing (98° C.) was performed for 8 minutes before the superheated steam processing step ("superheated steam processing (1 minute), water immersion (30 seconds), superheated steam processing (1 minute), water immersion, (30 seconds), and superheated steam processing (1 minute)") in Example 1, the same steps as in Example 1 were performed to thereby obtain dried fried chicken breast.

(Comparative Example 1) (Case Where Steam Processing was Performed Instead of Superheated Steam Processing)

Except that, instead of the superheated steam processing step in Example 1, steam processing (98° C.) was performed for 8 minutes, the same steps as in Example 1 were performed to thereby obtain dried fried chicken breast.

Evaluation of Reconstitution Properties

As for fried chicken after drying obtained by the Examples and Comparative Examples, reconstitution properties were evaluated according to the following method. In a cup shaped container, 5 g (1 piece) of the above-described fried chicken was placed, 300 g of hot water was poured thereto, and the chicken was eaten 3 minutes later.

Evaluation of reconstitution properties was performed by four skilled panelists in five grades (5: good reconstitution properties ⇔ 1: bad reconstitution properties).

TABLE 1

| Test section | Evaluation |
| --- | --- |
| Example 1 | 5 |
| Example 2 | 4 |
| Comparative Example 1 | 2 |

As clearly seen from the result shown in the table, the reconstitution properties were enhanced by performing the superheated steam processing.

Test Example 2

Example 3

Freeze-dried stewed pork cubes were produced using pork as a meat raw material and evaluated effects of the superheated steam processing. The freeze-dried stewed pork cubes were prepared according to the following procedure.

Excess fat, tendons, and blood vessels were removed from a pork block (product temperature of 10° C. or less). The obtained pork was injected with pickle liquid, tumbled for 12 hours, and left at 10° C. or less overnight.

After the pork was coated with a binding agent on the surface thereof, filled into a retainer and molded, the resulting poke was left at ordinary temperature for 60 minutes, and then, subjected to steaming so that a product temperature was reached to 92° C. and maintained the temperature for 90 minutes. The pork after steaming was cooled with running water for 10 minutes and slow frozen to a product temperature of 0 to −10° C. over about 10 hours.

The frozen pork was partially thawed and cut into prisms with a square base of 50 mm×50 mm and a thickness of 15 mm.

The superheated steam processing was performed by maintaining the cut pork (in the thawed state) at a temperature of the inside of the apparatus of 160° C. and a steam flow rate of 170 kg/h for 1 minute using a superheated steam processing apparatus (continuous flat conveyor type).

The cut pork after the superheated steam processing was added into a flavoring liquid and immersed at 4° C. overnight. After immersion, the cut pork was drained and slow frozen to a product temperature of 0 to −10° C. over about 10 hours. Furthermore, the frozen cut pork was placed in a vacuum freeze dryer and freeze dried while keeping a shelf temperature at 60° C. under 0.8 Torr for 24 hours to thereby prepare dried stewed pork cubes.

Comparative Example 2

Except that the superheated steam processing was not performed in the above Example 3, processing was performed in the same way as in Example 3 to prepare freeze-dried stewed pork cubes.

Evaluation of Reconstitution Properties

As for the fried chicken after drying obtained by the Example and Comparative Example, reconstitution properties were evaluated according to the following method. In a cup shaped container, 15 g (1 piece) of the stewed pork cube was placed, 300 g of hot water was poured thereto, and the pork was eaten 5 minutes later. Evaluation of reconstitution properties was performed by four skilled panelists in five grades (5: good reconstitution properties ⇔ 1: bad reconstitution properties).

TABLE 2

| Test section | Evaluation |
| --- | --- |
| Example 3 | 5 |
| Comparative Example 2 | 2 |

As clearly seen from the result shown in the table, the reconstitution properties were enhanced by performing the superheated steam processing.

Test Example 3

Example 4

Dried food of hamburg steaks, which is meat-based food, was produced as follows. As meat raw materials, 160 g of pork and 160 g of lard were mixed, and 100 g of onion was further added thereto and mixed. To this, 70 g of particulate protein, 43 g of bread crumbs, 400 g of water, and 12 g of extracts were further added and thoroughly mixed, and further mixed in a mixer such that the whole became uniform.

Next, the mixture was formed into a shape with 70 mm×55 mm with a width of 15 mm to thereby prepare mince mixture of 56 g per piece.

The mince mixture was subject to steam processing (98° C., 8 minutes) (after a temperature was reached to 80° C., the temperature was maintained for 1 minute.) After that, the superheated steam processing of the formed product after steaming was performed by maintaining at a temperature of the inside of the apparatus of 290° C. and a steam flow rate of 170 kg/h for 2.5 minutes using a superheated steam processing apparatus (continuous flat conveyor type).

The hamburg steaks after the superheated steam processing were cooled by air cooling.

The cooled hamburg steaks were slow frozen to a product temperature of 0 to −10° C. over about 10 hours.

Furthermore, the frozen hamburg steaks were placed in a vacuum freeze dryer and freeze dried while keeping a shelf temperature at 60° C. under 0.8 Torr for 24 hours to thereby obtain dried hamburg steaks.

(Example 5) (Case where Superheated Steam Processing and Water Immersion are Combined)

Except that the air cooling after the superheated steam processing in Example 4 was replaced by water immersion (1 minute), the same steps as in Example 4 were performed to thereby obtain dried hamburg steaks.

(Comparative Example 3) (Case where Oven Heating Processing was Performed Instead of Superheated Steam Processing)

Except that oven heating (290° C., 2.5 minutes) was performed instead of the superheated steam processing in the above Example 4, the same steps as in Example 4 were performed.

Evaluation of Reconstitution Properties

As for the hamburg steaks after drying obtained by the Examples and Comparative Examples, reconstitution properties were evaluated according to the following method. In a cup shaped container, 15 g (1 piece) of the hamburg steak was placed, 300 g of hot water was poured thereto, and the hamburg steak was eaten 3 minutes later.

Evaluation of reconstitution properties was performed by four skilled panelists in five grades (5: good reconstitution properties ⇔ 1: bad reconstitution properties).

TABLE 3

| Test section | Evaluation |
|---|---|
| Example 4 | 4 |
| Example 5 | 5 |
| Comparative Example 3 | 2 |

As clearly seen from the result shown in the table, the reconstitution properties were enhanced by performing the superheated steam processing. Additionally, reconstitution properties were further enhanced by adding water before freeze drying.

The invention claimed is:

1. A method for producing meat-based dried food that is to be reconstituted by pouring hot or cold water thereto before eating, comprising;
processing a meat with superheated steam;
adding additional moisture to the meat processed with superheated steam;
freezing the moisture-added meat; and
drying the frozen meat under reduced pressure.

2. The production method according to claim 1, wherein the superheated steam processing is performed in the state where the meat is frozen.

3. The production method according to claim 1, comprising performing a subsequent superheated steam processing of the meat, after the adding additional moisture and before the freezing.

4. The production method according to claim 2, comprising performing a subsequent superheated steam processing of the meat, after the adding additional moisture and before the freezing.

5. The production method according to claim 3, wherein the moisture addition followed by the subsequent superheated steam processing is performed more than once.

6. The production method according to claim 4, wherein the moisture addition followed by the subsequent superheated steam processing is performed more than once.

* * * * *